United States Patent
Fink

(10) Patent No.: US 9,806,545 B2
(45) Date of Patent: *Oct. 31, 2017

(54) BATTERY MANAGEMENT SYSTEM, MOTOR VEHICLE AND BATTERY MODULE

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 410 days.

This patent is subject to a terminal disclaimer.

(21) Appl. No.: 14/407,996

(22) PCT Filed: Jun. 7, 2013

(86) PCT No.: PCT/EP2013/061759
§ 371 (c)(1),
(2) Date: Dec. 15, 2014

(87) PCT Pub. No.: WO2013/189758
PCT Pub. Date: Dec. 27, 2013

(65) Prior Publication Data
US 2015/0103448 A1    Apr. 16, 2015

(30) Foreign Application Priority Data
Jun. 18, 2012 (DE) .................. 10 2012 210 166

(51) Int. Cl.
*H02H 3/00* (2006.01)
*H02J 7/00* (2006.01)
(Continued)

(52) U.S. Cl.
CPC .......... *H02J 7/0029* (2013.01); *H01M 2/347* (2013.01); *H02H 3/08* (2013.01); *H02H 7/18* (2013.01);
(Continued)

(58) Field of Classification Search
CPC ..................................................... H02J 7/0029
(Continued)

(56) References Cited

U.S. PATENT DOCUMENTS 4,025,820 A * 5/1977 Penrod .................. H01H 9/542
361/13
5,939,217 A    8/1999 Tamura et al.
(Continued)

FOREIGN PATENT DOCUMENTS

| DE | 10 2009 000 682 A1 | 8/2010 |
| WO | 93/10589 A1 | 5/1993 |
| WO | 2010/133176 A1 | 11/2010 |

OTHER PUBLICATIONS

International Search Report corresponding to PCT Application No. PCT/EP2013/061759, mailed Oct. 8, 2013 (German and English language document) (5 pages).

*Primary Examiner* — Stephen W Jackson
(74) *Attorney, Agent, or Firm* — Maginot, Moore & Beck LLP

(57) ABSTRACT

A battery management system for a battery module having at least one battery cell provides a current path between poles of the battery module in response to a tripping signal. The current path prevents or terminates an arc in a fuse of the at least one battery cell after the fuse has been tripped. The battery management system can further include an apparatus to trip the fuse and provide the tripping signal in response to identifying the tripping of the at least one fuse.

(Continued)

The battery management system can further include an apparatus to receive the tripping signal.

12 Claims, 3 Drawing Sheets

(51) Int. Cl.
    *H01M 2/34*          (2006.01)
    *H02H 3/08*          (2006.01)
    *H02H 7/18*          (2006.01)

(52) U.S. Cl.
    CPC .. *H01M 2200/103* (2013.01); *H01M 2220/20* (2013.01)

(58) Field of Classification Search
    USPC .......................................................... 361/2
    See application file for complete search history.

(56) References Cited

U.S. PATENT DOCUMENTS

| | | | |
|---|---|---|---|
| 8,133,287 B2 * | 3/2012 | Hermann | H01M 2/202 29/623.1 |
| 9,160,163 B2 * | 10/2015 | Fink | H02H 7/18 |
| 2011/0228436 A1 | 9/2011 | Lee et al. | |
| 2012/0034497 A1 | 2/2012 | Hermann et al. | |
| 2012/0105015 A1 | 5/2012 | Hermann et al. | |

\* cited by examiner

BATTERY MANAGEMENT SYSTEM, MOTOR VEHICLE AND BATTERY MODULE

This application is a 35 U.S.C. §371 National Stage Application of PCT/EP2013/061759, filed on Jun. 7, 2013, which claims the benefit of priority to Serial No. DE 10 2012 210 166.7, filed on Jun. 18, 2012 in Germany, the disclosures of which are incorporated herein by reference in their entirety.

The present invention disclosure relates to a battery management system for battery modules having at least one battery cell, for example a lithium-ion battery cell. The present invention disclosure further relates to a motor vehicle.

BACKGROUND

Battery modules having one or more lithium-ion battery cells can be found, for example, in motor vehicles, for instance electric motor vehicles or hybrid motor vehicles, in conjunction with drives of the motor vehicles.

Battery modules for use in the drive train of motor vehicles are also referred to as traction battery modules. Battery modules of this kind can be designed as systems comprising a battery cell and a battery management system. In order to provide the power which is required in hybrid vehicles and electric vehicles, battery cells are connected in series and in some cases also in parallel in the battery modules. In the case of electric vehicles, battery systems have, in some cases, voltages above 450 V, and in the case of hybrid vehicles even the voltage of 60 V, which is assumed as a safety threshold for contact with people, is exceeded. If battery systems of this kind are short-circuited due to external events, such as accidents or a malfunction in the actuation of a power switch, currents with current strengths which may cause the battery to burst or to catch fire may be produced in the battery cells.

FIG. 1 shows a basic circuit diagram of a traction battery module 5 according to the prior art, as is known from laid-open patent application DE 10 2009 000 682 for example. FIG. 1 shows two poles 10 and 20 which are electrically connected by means of a current path 30 on which battery cells 15, as voltage sources, are arranged in series, so that a voltage which is provided cumulatively by the cells 15 can be tapped off across the poles. In addition, the module has a charging and disconnecting device 40 at the positive pole 10, a disconnecting device 50 at the negative pole 20 and a service plug 60.

FIG. 2 shows a basic circuit diagram of a battery cell 15 according to the prior art, as is known from U.S. Pat. No. 5,939,217 for example. Said figure shows two poles 100 and 200 across which a voltage which is provided by the cell 15 can be tapped off from a voltage source 300. In addition, the cell has a fuse 400 at the positive pole 100. The fuse 400 has the function of reliably disconnecting the voltage source 300 from the positive pole 100 in the case of an abnormal state of temperature or current flow in the battery cell 15.

International patent application WO1993010589 discloses an apparatus for balancing out the states of charge of subunits of a battery. Each subunit is provided with a discharge circuit with resistors and fuses which are connected in series. The discharge circuit can be switched.

SUMMARY

The disclosure provides a battery management system for a battery module having at least one battery cell, wherein the battery management system is designed such that it can provide a current path between poles of the battery module in response to a tripping signal.

According to the disclosure, the current path is designed in this case such that an arc in a fuse of the at least one battery cell after the fuse has been tripped is prevented or terminated by the provision of the current path.

This increases the protection against hazards which can arise from a battery cell with a fuse when an arc is formed after tripping of the fuse.

The inventors have specifically determined that in traction battery modules having battery cells with an integrated fuse, arcs can be formed after the fuse is tripped.

In a first advantageous embodiment, the current path is designed such that the at least one fuse is tripped when the second current path is provided. This allows controlled tripping of the fuse.

In a second advantageous embodiment, the battery management system comprises an apparatus for identifying tripping of the fuse and for providing the tripping signal in response to tripping of the at least one fuse being identified. This allows arcs to be prevented after the fuse is tripped due to external events.

In a variant, the battery management system according to the first advantageous exemplary embodiment comprises an apparatus for receiving the tripping signal.

This permits use in a motor vehicle together with an apparatus for providing the tripping signal in response to a hazardous situation for a motor vehicle being identified, wherein the apparatus for receiving the tripping signal is connected to the apparatus for providing the tripping signal. In this way, it is possible to prevent a traction battery module of a hybrid vehicle or electric vehicle from catching fire or bursting as a result of a hazardous situation for the motor vehicle.

The disclosure further presents a motor vehicle as claimed in claim 6 and a battery module as claimed in claim 7.

BRIEF DESCRIPTION OF THE DRAWINGS

Exemplary embodiments of the disclosure will be explained in greater detail with reference to the following description and the drawings, in which.

DETAILED DESCRIPTION

Figure 1:
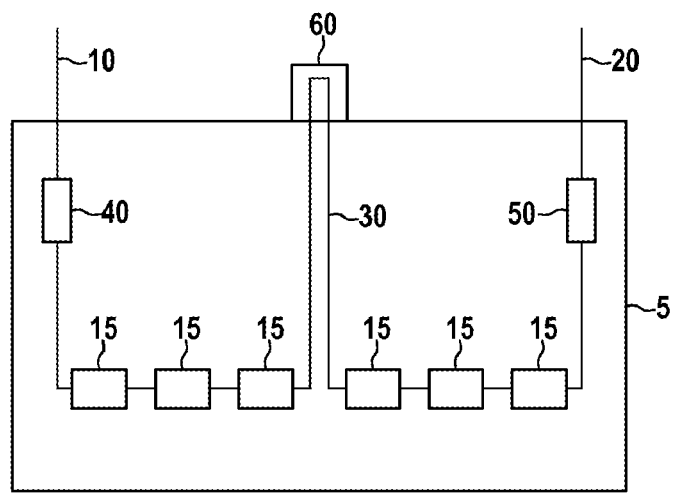
FIG. 1 shows a basic circuit diagram of a traction battery module according to the prior art.
Figure 2:
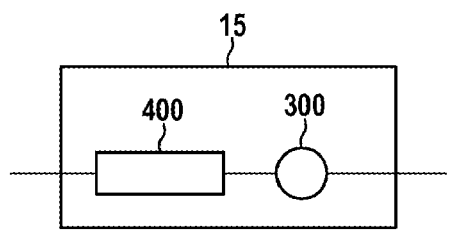
FIG. 2 shows a basic circuit diagram of a battery cell according to the prior art.
Figure 3:
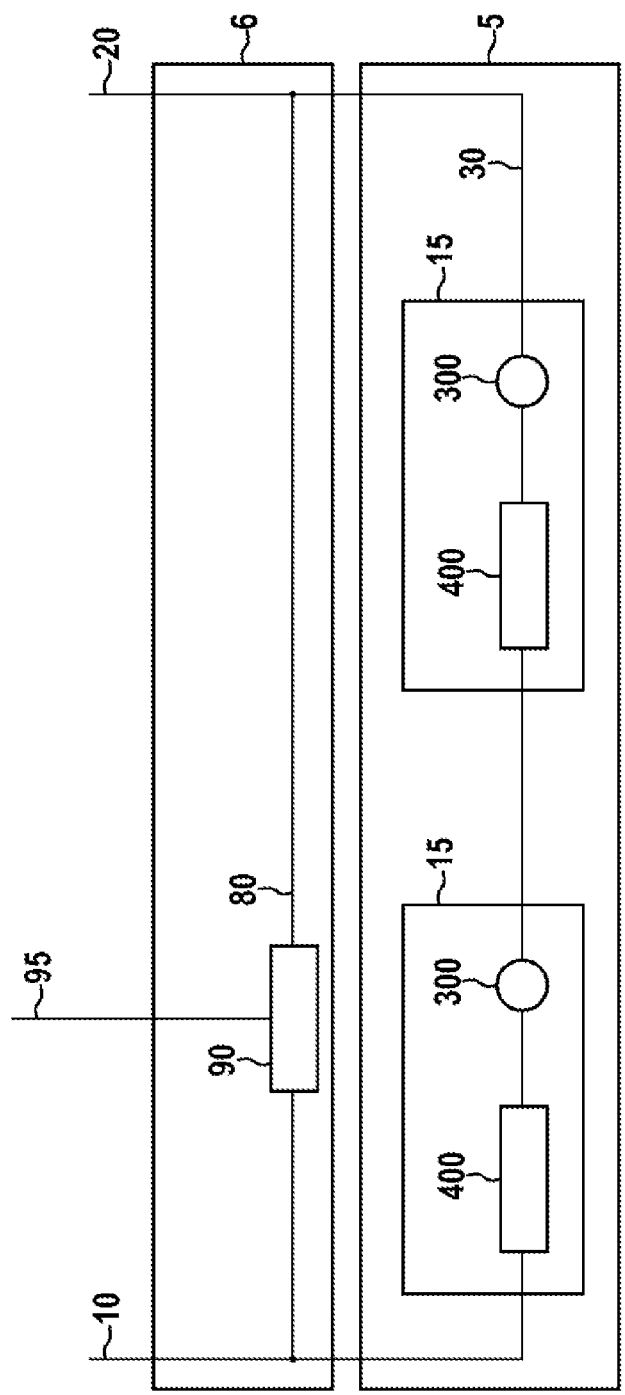
FIG. 3 shows a basic circuit diagram of a first exemplary embodiment of the disclosure.

FIG. 3 shows a basic circuit diagram of a first exemplary embodiment of the disclosure. It shows a battery module 5 having two poles 10 and 20 which are electrically connected by means of a current path 30 on which battery cells 15 having voltage sources 300 and fuses 400 are arranged in series, with the result that a voltage which is provided by the cells 15 can be tapped off across the poles 10, 20 of the module 5. FIG. 3 further shows a battery management system 6 having a second, parallel current path 80 by means of which the poles 10 and 20 of the battery module 5 can be electrically connected. In the exemplary embodiment shown, the second current path 80 can be provided by closing a switch 90. In this case, the battery management system 6 has an input 95 for receiving a tripping signal which causes the switch 90 to close.

In this case, the second current path 80 has low impedance, that is to say is designed with a low electrical resistance value which permits the module 5 to be short-circuited in a controlled manner. Closing the second current path 80 generates currents in the cells 15, said currents tripping at least one of the fuses 400 and interrupting the first current path.

However, the currents which are generated by closing the second current path 80 are not so high that this could produce arcs in tripped fuses 400 or arcs which are already present before the second current path 80 is closed continuing to be present.

The battery module 5 according to the first exemplary embodiment is suitable for use in a motor vehicle in conjunction with a system for identifying hazardous situations for a motor vehicle, for example a crash sensor. After a hazardous situation, for example an accident, is identified, the crash sensor transmits a tripping signal to the battery module 5 or the battery management system 6 which, in response to receiving the tripping signal, closes the second current path 80 and thereby short-circuits the cells which are combined in the battery in a controlled manner.

Figure 4:
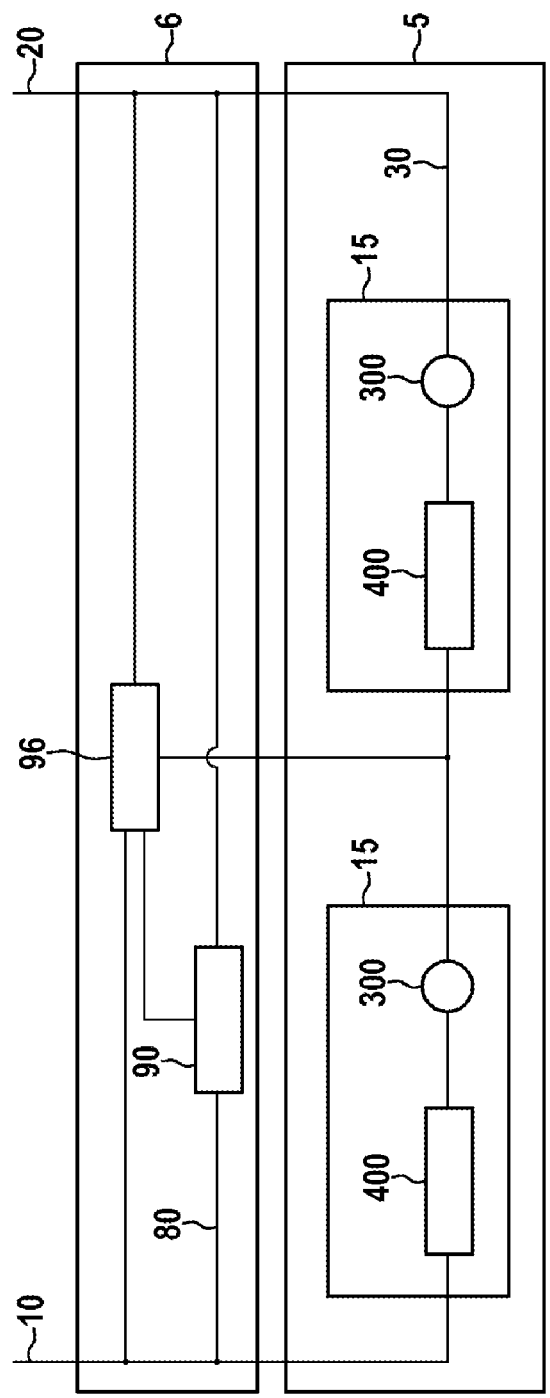
FIG. 4 shows a basic circuit diagram of a second exemplary embodiment of the disclosure.

FIG. 4 shows a basic circuit diagram of a second exemplary embodiment of the disclosure. This basic circuit diagram differs from the basic circuit diagram shown in FIG. 3 in that the tripping signal, with which the second current path 80 can be provided, is provided by an apparatus 96 for identifying tripping of one of the fuses 400 in response to tripping of one of the fuses 400 being identified. In the shown second exemplary embodiment, the apparatus 96 comprises sensing lines for detecting the cell voltages of the battery cells 15.

If the apparatus 96 identifies that at least one of the fuses 400 has been tripped, said apparatus generates the tripping signal which closes the switch 90 and therefore provides the second current path 80. In this case, the second current path 80 has low impedance, that is to say is designed with a low electrical resistance value, so that a voltage difference which may possibly be produced between the poles 10, 20 of the module 5 and could lead to or has already led to an arc being formed in the blown fuse 400 without the second current path 80 can then be reduced by means of the second current path 80 and the formation of an arc can therefore be prevented or terminated.

The invention claimed is:

1. A battery management system for a battery module having at least one battery cell, the at least one battery cell having a voltage source and a fuse arranged in series, the battery management system comprising:
    a switch connected between poles of the battery module,
    wherein the battery management system is configured to close the switch to provide a current path between the poles of the battery module in response to a tripping signal, the current path being configured to prevent or terminate an arc in the fuse of the at least one battery cell after the fuse has been tripped.

2. The battery management system as claimed in claim 1, wherein the current path is further configured to trip the fuse of the at least one battery cell when the current path is provided.

3. The battery management system as claimed in claim 1 further comprising:
    an apparatus configured to (i) identify a tripping of the fuse of the at least one battery cell and (ii) provide the tripping signal in response to the identifying of the tripping.

4. The battery management system as claimed in claim 1 further comprising:
    an input configured to receive the tripping signal.

5. The battery management system as claimed in claim 4, wherein the input is connected to a sensor of a motor vehicle configured to provide the tripping signal in response to a hazardous situation for the motor vehicle being identified.

6. A motor vehicle comprising:
    a battery module including at least one battery cell having a voltage source and a fuse arranged in series; and
    a battery management system including:
        a switch connected between poles of the battery module; and
        an apparatus configured to (i) identify a tripping of the fuse of the at least one battery cell and (ii) provide a tripping signal in response to the identifying of the tripping,
        wherein the battery management system is configured to close the switch to provide a current path between the poles of the battery module in response to tripping signal, the current path being configured to prevent or terminate an arc in the fuse of the at least one battery cell after the fuse has been tripped.

7. A battery module, comprising:
    at least one battery cell having a voltage source and a fuse arranged in series; and
    a battery management system including:
        a switch connected between poles of the battery module; and
        wherein the battery management system is configured to close the switch to provide a current path between the poles of the battery module in response to tripping signal, the current path being configured to prevent or terminate an arc in the fuse of the at least one battery cell after the fuse has been tripped.

8. The motor vehicle as claimed in claim 6, the battery management system further comprising:
    an input configured to receive the tripping signal.

9. The motor vehicle as claimed in claim 8 further comprising:
    a sensor configured to provide the tripping signal in response to a hazardous situation for the motor vehicle being identified, the input of the battery management system being connected to the sensor.

10. The battery module as claimed in claim 7, the battery management system further comprising:
    an apparatus configured to (i) identify a tripping of the fuse of the at least one battery cell and (ii) provide the tripping signal in response to the identifying of the tripping.

11. The battery module as claimed in claim 7, the battery management system further comprising:
    an input configured to receive the tripping signal.

12. The battery module as claim in claim 11, wherein the input is connected to a sensor of a motor vehicle configured to provide the tripping signal in response to a hazardous situation for the motor vehicle being identified.

* * * * *